3,247,062
ANTIBACTERIAL AND ANTIFUNGAL COMPOSITION FOR AGRICULTURAL AND FISHERIES APPLICATIONS
Shohei Kawaji and Tadashi Wakazawa, Kawasaki-shi, Shunzo Fukatsu, Tokyo, and Yoshinori Sugano, Yokohama, Japan, assignors to Meiji Seika Kaisha, Ltd., Tokyo, Japan, a corporation of Japan
No Drawing. Filed Feb. 15, 1962, Ser. No. 173,358
Claims priority, application Japan, Feb. 24, 1961, 36/5,896
2 Claims. (Cl. 167—65)

This invention relates to an antibacterial and antifungal composition for agricultural and fisheries applications which contains as the active ingredient a complex salt of kanamycin combined with a water-soluble inorganic metal salt.

The complex salt of kanamycin combined with a water-soluble metal salt according to the invention may be prepared as described hereinafter. The complex salt of kanamycin is sparingly soluble in water and shows not only an antibacterial activity owing to the kanamycin component but also an antifungal, anti-yeast activity; it is thus suitable for use in the agricultural application, including e.g. control of bacterial leaf blight of rice plant and in the fishing application, including e.g. control of diseases of trout caused by parasitic bacteria and fungi appearing in the culture of trout.

The term "kanamycin" used in the invention includes free kanamycin, salts of kanamycin such as kanamycin sulfate, hydrochloride and the like, as well as kanamycin B, salts of kanamycin B and mixtures containing one or more of the aforesaid substances. As the water-soluble metal salt there may be used many of water-soluble inorganic metal salts such as, for example, copper sulfate, nickel sulfate, cobalt chloride, zinc chloride, magnesium sulfate, ferrous chloride, etc. It is desirable that the water-soluble inorganic metal salt is contained in the complex salt in an amount of from about 0.5 to 3 mol. per mol. of the kanamycin component.

The complex salt of kanamycin and a water-soluble inorganic metal salt may be prepared by dissolving kanamycin or a material containing it in water, and subsequently adding to the solution a proper proportion of a water-soluble inorganic metal salt desired. The reaction may readily proceed at room temperature but it is also possible to promote the reaction by heating. The pH of the reaction medium may be then kept between about 4 and 8. After the completion of the reaction, the solution may be evaporated to dryness but it is also possible to precipitate the complex salt of kanamycin by adding a water-miscible organic solvent such as, for example, methanol, ethanol and the like.

The process of preparing the complex salt of kanamycin is illustrated below with reference to the following examples.

EXAMPLE 1

3.0 grams (0.005 mol.) of kanamycin sulfate ($C_{18}H_{36}N_4O_{11} \cdot H_2SO_4 \cdot H_2O$)

are dissolved in 25 cc. of distilled water by heating. 1.26 grams (0.005 mol.) of nickel sulfate ($NiSO_4 \cdot 7H_2O$) are then added to the solution and uniformly dissolved therein. The resulting solution is allowed to leave overnight and then filtered. 120 cc. of ethanol are added to the filtrate to give the precipitate and 3.7 grams of the complex salt of the kanamycin sulfate with nickel sulfate are obtained.

This complex salt obtained shows a potency of 617 mcg./mg. and $[\alpha]_D = +95°$ (C. 0.5, $H_2O$). It further shows the antibacterial and antifungal activities.

EXAMPLE 2

On one hand, an aqueous solution of kanamycin sulfate is prepared as described in Example 1. On other hand, a solution of copper sulfate is prepared by dissolving 1.25 gr. (0.005 mol.) of copper sulfate ($CuSO_4 \cdot 5H_2O$) in 3.5 cc. of distilled water. Both the solutions are combined together and the mixture becomes slowly blue-violet colored. After the mixture has been allowed to stand overnight, the solution is filtered and then precipitated by adding 120 cc. of ethanol. The precipitate formed is removed out by filtration and 3.5 grams of the complex salt of the kanamycin sulfate with copper sulfate are obtained. This complex salt shows a potency of 630 mcg./mg. and $[\alpha]_D = +102°$ (C. 0.48, $H_2O$). It further shows the antibacterial and antifungal activities.

EXAMPLE 3

When 0.63 gram (0.0025 mol.) of copper sulfate ($CuSO_4 \cdot 5H_2O$) are added and dissolved into an aqueous solution of the kanamycin sulfate which was prepared in the same manner as in Example 1, the solution becomes deeply blue-violet colored. This solution is then treated as described in Example 1 and 3.5 grams of the complex salt of the kanamycin salt with copper sulfate are obtained as a violet-colored powdered.

This complex salt shows a potency of 698 mcg./mg. and $[\alpha]_D = +105°$ (C. 0.5, $H_2O$).

EXAMPLE 4

When a solution of 2.5 grams (0.01 mol.) of copper sulfate ($CuSO_4 \cdot 5H_2O$) dissolved in 7.5 cc. of distilled water is added to an aqueous solution of the kanamycin sulfate which was prepared in the same manner as in Example 1, the aqueous solution becomes greenish-blue colored. This solution is allowed to leave overnight at the room temperature, filtered and then treated as described in Example 1. 3.3 grams of the complex salt of the kanamycin sulfate with copper sulfate are thus obtained as a greenish blue powder.

This complex salt shows a potency of 509 mcg./mg. and $[\alpha]_D = +66.5°$ (C. 0.5, $H_2O$).

EXAMPLE 5

A solution of 0.19 gram (0.007 mol.) of nickel sulfate ($NiSO_4 \cdot 7H_2O$) in 5 cc. of water is added to 25 ml. of a waste mother liquor which is obtained by removing the crystals of kanamycin sulfate from a filtrate of a kanamycin-fermentation beer and which contains about 0.0078 mol. of kanamycin B. The resulting solution shows a pH of 6.3 and the color of the solution changes from deep yellowish brown to deep yellowish green. Methanol is added to the solution and the precipitate formed is removed by filtration to yield 3.5 grams of a powder of greenish gray color. This powder shows the antibacterial, antifungal and anti-yeast activities.

The thus obtained complex salt comprising the kanamycin sulfate and nickel sulfate is expressed with the general formula:

$$C_{18}H_{36}N_4O_{11} \cdot NiSO_4 \cdot H_2SO_4 \cdot xH_2O$$

where x is from 0 to 2, and shows the following analysis:

|   | Found | Calculated | |
|---|---|---|---|
|   |   | x=1 | x=2 |
| C | 28.23 | 28.60 | 27.94 |
| H | 5.59 | 5.34 | 5.48 |
| N | 5.92 | 7.42 | 7.25 |
| S |   |   |   |
| Ni | 6.75 | 7.77 | 7.59 |

The minimum inhibition concentrations of this complex salt against various bacteria, fungi and yeasts are tabulated in Table 1 below.

Table 1

| | Medium | Kanamycin A, 24 hrs, γ/ml. | Kanamycin sulfate-nickel sulfate complex salt, 24 hrs. γ/ml. |
|---|---|---|---|
| Aerobacter aerogenes IAM 1102 | Heart infusion | 0.63 | 0.63 |
| Bacillus cereus IAM 1110 | ___do___ | 1.56 | 1.56 |
| Escherichia coli IAM 1253 | ___do___ | 3.13 | 3.13 |
| Micrococcus pyogenes var. aureus 209P | ___do___ | 0.31 | 0.31 |
| Proteus vulgaris | ___do___ | 12.5 | 6.25 |
| Salmonella paratyphi A | ___do___ | 0.39 | 0.39 |
| Salmonella paratyphi B | ___do___ | 3.13 | 3.13 |
| Streptococcus pyogenes N.Y. 5 IID | ___do___ | 12.5 | 12.5 |
| Mycobacterim 607 [1] | Dobos | 1.56 | 1.56 |
| Saccharomyces cerevisiae Mis 2-6 [1] | Y-M | >1,000 | 500 |
| Saccharomyces rouxii IFO 0845 [1] | Y-M | 250 | 500 |
| Torula utilis [1] | Y-M | 62.5 | 62.5 |
| Willia anomala [1] | Y-M | >1,000 | 500 |
| Aspergillus niger [1] | Y-M | >1,000 | 500 |
| Chetomium globosum ATCC 6205 [1] | Y-M | 250 | 125 |
| Monilia sitophila IFO 6070 [1] | Y-M | 250 | 250 |
| Mucor pusillus IAM Mu-1-4 [1] | Y-M | 250 | 500 |
| Penicillium chrysogenum Q 176 [1] | Y-M | >1,000 | 1,000 |

[1] Estimation is made after 48 hrs.

Moreover, the complex salt comprising the kanamycin sulfate and copper sulfate produced as described in the above is expressed with the general formula:

$$C_{18}H_{36}N_4O_{11} \cdot CuSO_4 \cdot H_2SO_4 \cdot xH_2O$$

where $x$ is from 0 to 2, and shows the following analysis:

| | Found | Calculated | |
|---|---|---|---|
| | | $x=1$ | $x=2$ |
| C | 28.11 | 28.42 | 27.76 |
| H | 5.49 | 5.31 | 5.44 |
| N | 6.39 | 7.37 | 7.20 |
| S | ------ | ------ | ------ |
| Cu | 8.26 | 8.36 | 8.17 |

The minimum inhibition concentrations of this complex salt against various bacteria, fungi and yeasts are tabulated in Table 2 below.

Table 2

24 hrs., γ/ml.

Aerobacter aerogenes IAM 1102 _____ 0.78
Bacillus cereus IAM 1110 _____ 3.13
Escherichia coli IAM 1253 _____ 3.13
Micrococcus pyogenes var. aureus 209P _____ 0.39
Proteus vulgaris _____ 7.8
Salmonella paratyphi A _____ 0.78

Table 2—Continued 24 hrs. γ/ml.

Salmonella paratyphi B _____ 1.56
Streptococcus pyogenes N.Y. 5 IID _____ 12.5
Mycobacterium 607 [2] _____ 3.13
Kanthomonae oryzae _____ 0.5
Saccharomyces rouxii IFO 0845 [1] _____ 500.0
Willia anomala [1] _____ >1000
Aspergillus niger [1] _____ >1000
Chetomium globosum ATCC 6205 [1] _____ 1000
Monilia sitophils IFO 6070 [1] _____ 250.0
Mucor pusillus IAM Mu-1-4 [1] _____ 500.0
Penicillium chrysogenum O176 [1] _____ >1000
Phizopus nigricans IAM 37-39 [1] _____ 500.0

[1] Estimation is made after 48 hrs.
[2] Estimation is made after 5 hrs.

Furthermore, as the water-soluble metal salt which is capable of forming the complex salt with kanamycin, in addition to the nickel sulfate, copper chloride, there may be also used nickel chloride, cobalt chloride, zinc chloride, magnesium sulfate, cadmium chloride, iron chloride, etc. The activities of the complex salts of kanamycin with these water-soluble metal salts also can be seen from the following Table 3 which shows the diameter of the inhibition zone of growth of various bacteria by means of paper-disc assay method.

Table 3

| | Bacillus subtilis ATCC 6633, mm. | Micrococcus pyogenes var. aureus 209P, mm. | Pseudomonas aeruginosa, mm. | Mycobacterium 607, mm. |
|---|---|---|---|---|
| Kanamycin | 21.2<br>21.8<br>21.0<br>21.1 | 20.7<br>20.5<br>21.5 | 19.5<br>19.0<br>18.1<br>19.1 | 18.5<br>18.6<br>19.1<br>19.4 |
| Kanamycin-CuCl₂ complex salt | 22.0<br>23.0<br>22.0<br>22.0 | 21.7<br>22.0<br>22.0 | 22.0<br>21.0<br>20.3<br>21.7 | 21.7<br>22.5<br>21.7<br>21.3 |
| Kanamycin-NiCl₂ complex salt | | | | 23.0<br>21.0<br>21.0<br>20.0 |
| Kanamycin-CoCl₂ complex salt | | 21.7<br>22.0<br>22.0 | 21.5<br>20.3 | 22.0<br>20.7<br>19.7<br>20.3 |
| Kanamycin-CdCl₂ complex salt | 22.5<br>22.5<br>21.3<br>21.8 | 21.7<br>22.0<br>21.7 | 21.7<br>22.8 | 19.8<br>19.8<br>21.0<br>19.9 |

Note.—The complex salts are used as 0.2% solution.

What we claim is:

1. An antibacterial and antifungal composition for agricultural and fisheries applications, which contains as the active ingredient a complex salt of kanamycin and water-soluble inorganic metal salt containing a metal selected from the group consisting of copper, nickel, cobalt, zinc, cadmium, magnesium and iron, and an anion selected from the group consisting of chloride and sulfate and an aqueous carrier.

2. The process of inhibiting growth of bacteria and fungi in plant and marine life comprising applying to said plant and marine life a complex salt of kanamycin and water-soluble inorganic metal salt containing a metal selected from the group consisting of copper, nickel, cobalt, zinc, cadmium, magnesium and iron, and an anion selected from the group consisting of chloride and sulfate and an aqueous carrier.

References Cited by the Examiner
UNITED STATES PATENTS

| | | | |
|---|---|---|---|
| 2,777,791 | 1/1957 | Visor et al. | 167—16 |
| 2,793,974 | 5/1957 | Rosen et al. | 167—30 |
| 2,908,606 | 10/1959 | Gordon | 167—33 |
| 2,931,798 | 4/1960 | Umezawa et al. | 260—210 |
| 2,936,307 | 5/1960 | Johnson et al. | 260—210 |
| 2,967,177 | 1/1961 | Johnson et al. | 260—210 |
| 3,032,547 | 1/1962 | Rothrock et al. | 260—210 |

LEWIS GOTTS, *Primary Examiner.*

MORRIS O. WOLK, *Examiner.*